United States Patent

Bartlett

[15] 3,649,342
[45] Mar. 14, 1972

[54] PRODUCT FOR FABRICATION OF DENSE CERAMIC ARMORPLATE AND LIKE

[72] Inventor: Howard J. Bartlett, Chippawa, Ontario, Canada

[73] Assignee: Norton Company, Worcester, Mass.

[22] Filed: Oct. 30, 1967

[21] Appl. No.: 681,606

[52] U.S. Cl. ..........................117/123 A, 106/44, 161/404, 117/169 R
[51] Int. Cl. ..........................................C04b 41/04
[58] Field of Search ..............75/200, 208; 109/82; 161/404; 89/36; 106/44; 29/182.7; 264/60; 117/123 A, 169 R

[56] References Cited

UNITED STATES PATENTS

| | | |
|---|---|---|
| 2,636,825 | 4/1953 | Nicholson..............................106/44 |
| 2,805,197 | 9/1957 | Thibault et al.......................106/44 X |
| 2,964,823 | 12/1960 | Fredriksson.........................106/44 X |
| 3,065,088 | 11/1962 | Lakewood et al. ........................106/44 |
| 3,165,864 | 1/1965 | Shulze ..................................106/44 |
| 3,175,918 | 3/1965 | McGahan ..............................106/44 X |
| 3,262,762 | 7/1966 | Bechtold et al.......................106/44 X |

*Primary Examiner*—Benjamin A. Borchelt
*Assistant Examiner*—Stephen C. Bentley
*Attorney*—Allan R. Redrow

[57] ABSTRACT

A product and method for producing a dense hard ceramic body formed by impregnating a high melting point matrix with a ceramic infiltrant having a lower melting point whereby various ceramic shapes may be cold formed and then impregnated to produce hard, wear resistant bodies having a density up to the theoretical density for the ultimate product.

4 Claims, No Drawings

PRODUCT FOR FABRICATION OF DENSE CERAMIC ARMORPLATE AND LIKE

BACKGROUND OF THE INVENTION

The usual method for producing dense ceramic bodies makes use of the hot-pressing technique. This involves the use of a precision mold having a shaped cavity and a plunger to fit into the cavity to apply pressure to the powdered ceramic material in the mold. The material is heated to sinter the ceramic while pressure is simultaneously impregnated so that as the bonding of the ceramic caused by the firing step proceeds under pressure, densification of the ultimate product is accomplished. Usually a relatively high degree of compaction can be accomplished if a relatively high pressure is applied for a long enough time, but even then it is difficult to attain a 100 percent densification of most ceramics. Also the fabrication of hot-pressing molds which then usually formed of graphite, is costly and furthermore, the shapes that can be hot-pressed in graphite molds are limited.

SUMMARY OF THE INVENTION

The present invention is an advance over the hot-pressing method and provides a much simpler procedure for making more complicated but dense shapes. Also the densification of the final product can be accomplished without making an expensive graphite mold. First, a porous matrix of a ceramic material is formed into a green shape. This may be done by taking advantage of any of the known cold forming techniques making possible the use of relatively inexpensive shaping procedures as compared with the known hot-pressing procedure. The porous green shape forms a matrix that may be heated in the presence of a lower melting ceramic infiltrant to simultaneously fire the matrix and effect impregnation thereof.

DETAILED DESCRIPTION

Hard wear resistant nonporous ceramic bodies are formed by impregnating a porous silicon carbide matrix with a predominantly boron carbide impregnant. The silicon carbide matrix can be formed into a desired shape by slip casting, or any other known cold forming procedure. The porous shape can then either be fired to sinter the mass which is then impregnated or a simultaneous sintering and impregnating step can be performed. In either instance the porous silicon carbide body is placed in contact with a powdered infiltrant material having a melting point lower than that of silicon carbide, such a material being pure boron carbide or a boron carbide mixed with certain additives. The silicon carbide matrix and boron carbide infiltrant powder are assembled together in a graphite boat and then the temperature of the assembly is raised while an inert atmosphere is provided. The boron carbide material upon becoming liquid, will migrate into the pores of the silicon carbide mass when a temperature of about 2,250° to 2,350° C. is reached and after a period of about 2 hours it will be found that a 100 percent impregnation results. The fully impregnated mass is then cooled and removed from the furnace.

As an example of my invention, I made a bar from grains of silicon carbide, the bar being slip cast in a mold one-half inch in diameter and 3 inches long. The silicon carbide powder made up of a mixture of 50 percent by weight of powder of less than 3 micron particle size and 50 percent of powder of less than 100 mesh particle size was formed into a slip and cast in a known manner using a technique as disclosed in the U.S. Pat. No. 2,964,823 to J. I. Fredriksson Dec. 20, 1960. The resulting slip cast bar had a porosity of about 18.9 percent resulting in a density of 2.61 grams/cubic centimeter. The bar was removed from the mold, dried and then placed vertically in a graphite container, with a boron carbide infiltrant powder heaped around one end. The boron carbide powder was substantially pure $B_4C$. The assembly was placed in a furnace and an inert atmosphere of argon was introduced into the hot zone while the temperature was raised to approximately 2,350° C. as determined by an optical pyrometer. The temperature was maintained for a time period of 2 hours and then the furnace was cooled while maintaining the argon atmosphere. The finished bar was found to be nonporous or 100 percent impregnated, with a density of 3.11 grams/cc.

The resulting bar was a smooth, black body having a thin layer of carbonaceous material on its surface. Under this layer there was a hard black body. A slight amount of internal graphitization within the bottom portion of the bar was noted.

In a second run, a similar slip of mixed silicon carbide powders was slip cast to form a bar ½×3 inches having a green density of 2.34 grams/cubic centimeter. This bar was impregnated with a predominantly boron carbide infiltrant at a temperature of 2,350° C. as described above, except that in this instance the boron carbide powder had admixed therewith 3.85 percent of cobalt powder. This additive had the effect of lowering the melting temperature of the boron carbide, thus the impregnant was more fluid in this instance and it was noted incidentally that the cobalt retarded the growth of crystals in the impregnant. After impregnation this bar was found to have a density of 3.10 g./cc., with no porosity. The cross bending strength of the bar after a standard test was found to be 10,150 p.s.i.

The resulting product had a thin soft layer of carbonaceous material on its surface but when this layer was removed a hard black surface was found.

| Analysis of Piece | Calculated Composition |
|---|---|
| Total C—28.97% | $B_4C$ —10.33% |
| Total B— 8.09% | SiC —87.00% |
| Si—60.90% | Free C— 0.63% |
| $Fe_2O_3$a— 0.16 | $Fe_2O_3$ — 0.16 |

Microscopic analysis of a polished section of this product with polished sections representing longitudinal and cross-sectional cuts as well as a thin section showed a uniform composition with the following phases:

| Phase | Amount | Comments |
|---|---|---|
| SiC | 90% | |
| $B_4C$ | 10% | Identified by powder film |
| Graphite | Less than 1% | Identified microscopically |
| Metallic(silicon) | Less than 1% | Probably silicon, seen only in polished sections |

It was further noted that the SiC had undergone considerable crystal growth with a tabular and subrounded habit, the tabular crystal being about 1×0.1mm. and randomly oriented. This phase was bounded by and contained irregularly shaped inclusions of boron carbide which was uniformly distributed throughout the specimens.

Hardness tests performed on a Bausch and Lomb metallograph indicated no apparent difference in hardness as between the SiC and boron carbide phases. Random indentations were made and typical readings showed it had a Knoop hardness range of 2,483 to 1,632 kg./mm².

In another example of this invention, the above-described slip of silicon carbide was slip cast to form a bar one-half inch diameter by 3 inches. The bar had a density of 2.52 grams cc. and was simultaneously sintered and impregnated with a mixture of boron carbide with 16.6 percent of aluminum nitride added. The infiltrant powder was made with boron carbide particles less than 5 microns in size mixed with aluminum nitride particles less than 100 mesh in size the infiltrant powder being heaped around the bottom of the vertically disposed bar placed in a graphite boat. The assembly was placed in the furnace and an atmosphere of argon was established in it while the temperature was raised to 2,250° C. and held for 2 hours. The aluminum nitride was added to the boron carbide powder to lower the melting point of the impregnant. The bar after cooling was found to have a density of 3.04 g./cc. and had 5.5 percent unfilled pores leaving a porosity of about 1 percent. The cross bending strength was 11,620 p.s.i.

This product had a black, smooth surface showing some large SiC crystals laying parallel to the surface. There was some evidence of surface attack on the rod where it was in contact with the powdered impregnant. The SiC crystal growth was apparently induced by the presence of the boron.

Another ½×3 inches slip cast bar of silicon carbide had a density of 2.63 g./cc. and was impregnated with a mixture which was predominantly boron carbide with 4.0 percent cobalt, 20 percent silicon carbide, and 16 percent aluminum nitride added. The bar and impregnant powder were placed in a graphite boat in a furnace having an argon atmosphere, the temperature was raised to 2,300° C. for 2 hours to produce a bar that had 82.4 percent of its pores filled and had a density of 3.02 grams/cc. with a final porosity of 2.5 percent in the mass. The cross bending strength of this bar was 10,350 p.s.i.

Bars of such construction can be used as dressing sticks for sharpening grinding wheels. They have an excellent wear resistance, for example, a rod impregnated with $B_4C$ and 16.6 percent aluminum nitride and with a final porosity of 3.5 percent had three wear resistance tests done by the Klafstad Test with average value of 0.6 which is better than hot-pressed alumina tool bit material.

Such a process can be used to impregnate the ceramic element of sand blast nozzle structures such as are shown in the U.S. Pat. Nos. 3,228,147 to Moore Jan. 11, 1966 and 3,032,930 to Williams May 8, 1962. The matrix for such a nozzle structure can be formed by slip casting a silicon carbide grain as described above. The slip cast matrix in the form of a hollow cylinder from 3 to 6 inches long, and 1 to 1 ⅝ inches in diameter with a center passage, is then fired to sinter and self-bond the silicon carbide structure. Thereafter the nozzle matrix is placed in a graphite boat with boron carbide grain passing through a 100 mesh screen and being retained on a 325 mesh screen and one or more of additives in contact with the bottom end thereof. When heated in a furnace containing an argon atmosphere at a temperature of 2,300° C. for a period of 3 hours, a dense nozzle results that has excellent wear resistant properties. With this technique it is possible to make intrically shaped venturi nozzles at a considerable saving in cost.

I have made armor tile for incorporation in a laminated armor structure using this technique. A plate 6×6 inches by approximately 0.375 inch thick was formed by slip casting in a conventional plaster of paris mold. A relatively fluid silicon carbide slip as described above was cast in the mold, dried, and sintered to produce the basic matrix. The matrix was then supported in an upright position with one or more plates in a graphite boat in contact with the impregnating mixture. In this instance the infiltrant was a mixture of boron carbide with 16.7 percent aluminum nitride. The plates were brought to temperature over a period of 3 hours and then were held at a temperature of 2,280° C. for a period of 1 hour. The furnace was then allowed to cool to room temperature. The furnace used was an induction heated graphite furnace and an inert argon atmosphere was maintained throughout the heating and cooling cycles. Upon inspection of the impregnated plate it was found that the lower edge of the plate was slightly graphitized where it had been in contact with the infiltrant.

Several of such plates were laminate in the known manner on their respective 12-ply fiber glass backup layers using polysulfide cement to form armor test structures. The structures were subjected to ballistic tests with 0.30 caliber United States Army Aviation Materiel Command (the Avcom) Specification. The results showed with areal densities in lbs./ft.² in the range of from 8.3 to 8.6, that the $V_{50}$ average was 327 feet per second above the Avcom ballistic base. By making use of any of the well-known cold forming procedures such as slip casting, cold-pressing, or isostatic pressing, relatively intricate basic shapes can be produced. Once the shape is formed, the impregnation can be easily completed as described above. In any forming operation no matter how performed it is desired that the grains of the matrix material be brought into a substantially self-bonding relationship with a minimum porosity of not less than about 12 to 15 percent open and interconnected porosity. Preferably a porosity of about 20 percent open and interconnecting porosity is desired to form a capillary system for distributing the impregnant throughout the entire mass of the matrix.

One or two firing steps can be used to complete the product. A silicon carbide matrix can be shaped and fired to form the basic element at temperatures of from 2,000° to 2,500° C. for a period of about one-half hour, and then can be fired again to be impregnated to render it dense, or the bottom part of a green form of the matrix can be covered with infiltrant powder and the assembly fired at a temperature of from 2,250° to 2,350° C. to simultaneously sinter the matrix and effect the infiltration thereof. In either case the resulting fired product may be partially infiltrated or the process can be continued to 100 percent densification. It is preferred that sintering and infiltration be completed simultaneously for economic considerations since both steps can be performed simultaneously without loss of strength in the ultimate product.

The matrix is preferably formed of a silicon carbide grain in the range of from less than 1 micron to 100 mesh in size. A matrix made with such grain will be found to have pores that are interconnected and of proper size to complete the infiltrating operation, but a mixture of grits 20 mesh and finer could be used.

The infiltrant made of a predominantly boron carbide powder, should be selected to fall within particle size range of through 100 mesh and on 325 mesh, but finer particle sized infiltrant material has been used successfully in the range of less than 5 microns. Additives in a range of particle sizes less than 100 mesh and in quantities such as cobalt in a range of 3 to 7 percent, aluminum nitride in the range of 2 to 16.6 percent and even silicon carbide in a size range of less than 1 micron up to 8 microns particles and from 20 to 25 percent, have been found useful in a boron carbide infiltrant powder. Cobalt tends to lower the melting point of boron carbide in fine powder form. Aluminum nitride may also be used to lower the melting point of boron carbide infiltrant powder, while silicon carbide in the infiltrant and having the micron sized particles, when used as an additive, acts as a deterent to the boron attack on the larger grained silicon carbide in the matrix. It is desirable to combat conditions leading to graphitization of the silicon carbide matrix and the above additives which lower the melting temperature of the boron carbide infiltrant or protect the silicon carbide matrix from attack were successful for this purpose.

I have found that a silicon carbide matrix can be impregnated with zirconium diboride in following this process, and a matrix composed of 60 percent silicon carbide and 40 percent zirconium diboride can likewise be impregnated with a lower melting ceramic infiltrant such as zirconium diboride.

The firing can be accomplished in any suitable furnace adapted to hold an inert atmosphere at temperatures in the range of from 2,000° C. to about 2,600° C. I fired the above described ½×3 inch bars in an electrical resistance-type furnace like that shown in the patent to Ridgeway, U.S. Pat. No. 2,125,588 Aug. 2, 1938, in which the temperatures and atmosphere can be easily controlled.

When percent of a composition is given above and is not otherwise specified, it is to be understood that the percentage is on a weight basis. Also when screen sizes are given, it is a standard Tyler screen size.

The above specification includes several examples of my invention. It will be apparent that many modifications thereof

I claim:

1. A ceramic body comprising a matrix formed of relatively high-temperature-melting silicon carbide grains self-bonded to each other by being sintered together and defining interconnecting pores throughout the matrix, a somewhat lower temperature melting boron carbide solidified infiltrant filling the interconnecting pores between the grains forming said matrix, said infiltrant and the matrix forming a substantially 100 percent dense ceramic object.

2. A ceramic body as in claim 1 wherein said interconnecting pores constitute about 12–20 percent of the volume of the matrix.

3. A ceramic body as in claim 2 wherein the silicon carbide grains are up to 20 mesh in size.

4. A ceramic body as in claim 3 wherein the silicon carbide grains are in the range up to 100 mesh in size.

* * * * *